(12) United States Patent
Colbourne

(10) Patent No.: US 6,353,692 B1
(45) Date of Patent: Mar. 5, 2002

(54) OPTICAL SWITCH

(75) Inventor: Paul Colbourne, Nepean (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/505,867

(22) Filed: Feb. 17, 2000

(51) Int. Cl.[7] .................. G02B 6/26; G02B 6/42
(52) U.S. Cl. .................. 385/16; 385/18; 385/19; 385/34; 385/36; 385/47
(58) Field of Search .................. 385/16, 18, 19, 385/34, 36, 47; 359/128

(56) References Cited

U.S. PATENT DOCUMENTS

| | | | | |
|---|---|---|---|---|
| 4,484,793 A | * | 11/1984 | Laude | 385/47 |
| 4,498,730 A | * | 2/1985 | Tanaka | 385/18 |
| 5,734,762 A | * | 3/1998 | Ho | 385/11 |
| 5,838,847 A | * | 11/1998 | Pan | 385/18 |
| 5,940,552 A | * | 8/1999 | Lewis | 385/18 |

* cited by examiner

Primary Examiner—Darren Schuberg
Assistant Examiner—Leo Boutsikaris
(74) Attorney, Agent, or Firm—Neil Teitelbaum

(57) ABSTRACT

A one-sided switch for redirecting light between adjacent ports. The switch uses a moveable refractor, in combination with a lens and a stationary reflector, to redirect light from one optical port to another. In a most simple embodiment light is redirected from one output port to another by repositioning the refractor in the optical path of the light and using only a single lens for collimating and focussing the light at the reflector and about the ports, respectively.

16 Claims, 5 Drawing Sheets

OPTICAL SWITCH

FIELD OF THE INVENTION

This invention relates to the switching of light between optical components, and more specifically to an optical switch for providing such switching.

BACKGROUND OF THE INVENTION

Optical switches of various kinds are well known for selectably switching light from one optical fiber or light-conducting path to another. One such switch is disclosed by Pan in U.S. Pat. No. 5,999,669 issued Dec. 7, 1999, which is incorporated herein by reference. Although this invention appears to adequately perform its intended function, it is believed to be costly to manufacture. For example, Pan's 1×2 switch requires three collimating lenses to input/output fibers to collimate and focus light received from input fibers and destined for output fibers respectively. Furthermore, Pan provides a two-sided switch wherein optical fibres extend from opposite ends of the switch to allow light to be switched from an input optical fibre on one end with two different output optical fibres at another end. Two-sided switches have proven successful for switching optical signals but remain bulky for packaging into devices requiring such switching. Furthermore two-sided optical switches are more costly to hermetically seal than a single-sided switch.

It is therefore an object of the invention to provide a more compact single-sided device providing similar functionality but requiring less space than a two-sided switch.

It is an object of the invention to provide a single-sided optical switch that obviates some of the disadvantages associated with two-sided prior art devices.

It is an object of this invention to provide an optical switch requiring fewer lenses than ports.

SUMMARY OF THE INVENTION

In accordance with the invention there is provided, an optical switch, comprising:
 a plurality of ports for transmitting and receiving a beam of light;
 a stationary reflector for receiving the beam of light from the at least one of the plurality of ports and for substantially reflecting at least a portion of the beam of light to an other of the plurality of ports;
 a lens disposed between the plurality of ports and the stationary reflector for substantially collimating the beam of light from at least one of the plurality of ports at the stationary reflector and for substantially focussing the beam of light about the plurality of ports;
 a moveable refractor selectably positionable between at least one of the plurality of ports and the stationary reflector, for switching the beam of light from one of the plurality of ports to an other of the plurality of ports via the lens and the stationary reflector.

An embodiment of the present invention provides one-sided switching through the use of a moveable refractor and a stationary mirror. Switching is effected by repositioning the refractor so as to redirect light from one output port to another. The use of a moveable refracting component is advantageous because the refracting component can be aligned with a relatively high degree of tolerance to small misalignment caused by unwanted vibration, which would affect moveable components more than fixed ones in a switching device. This is opposed to using a moveable mirror as the switching element, which is more sensitive to misalignment than a refracting component.

Advantageously, the switch, in accordance with this invention, can be configured to provide a switching device whereby two beams of light transmitted from a first and a second input port are switchable from two output ports to provide controlled feedback, or as a 1×2 switch by allowing a beam of light transmitted from a first port to be switched between output ports. Finally, having the optical fibres enter and leave on the same side makes the device more compact, while having fewer lenses than ports reduces the cost of fabricating and indeed reduces the space required to contain such a device.

BRIEF DESCRIPTION OF THE DRAWINGS

Exemplary embodiments of the invention will now be described in conjunction with the drawings in which.

DETAILED DESCRIPTION

Figure 1:
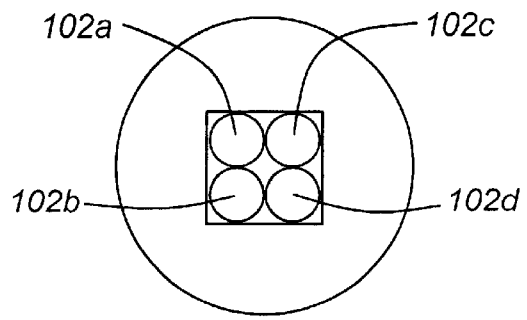
FIG. 1 is an end view of a fibre sleeve securely holding a plurality of optical fibres.
Figure 1A:
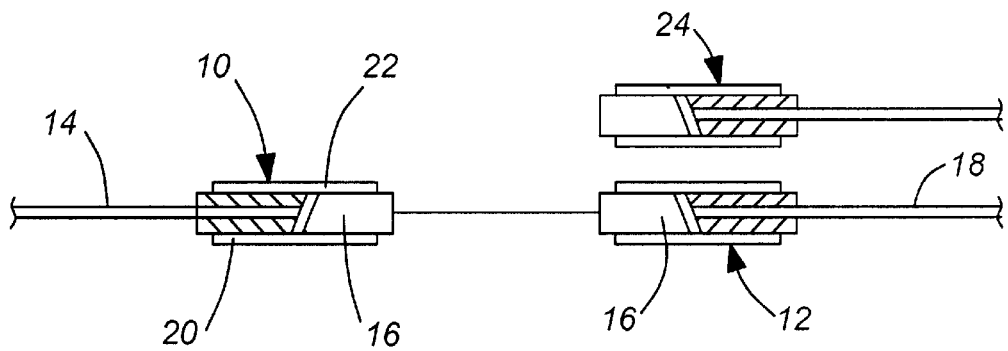
FIGS. 1A and 1B are schematic block diagrams depicting a selectable redirection of a beam of light by introducing an internally reflecting device in accordance with the prior art.
Figure 1B:
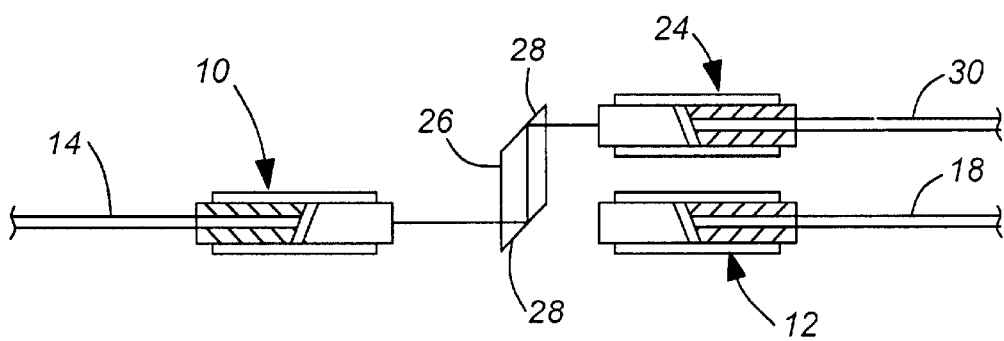

Turning now to FIGS. 2a through 2d, an optical switch in accordance with a preferred embodiment of the present invention is shown. An optical fibre sleeve 100 houses a plurality of optical fibre ends in a predetermined spaced relationship, for example as shown in FIG. 1. The end faces of the fibres serve as ports generally referred to as 102 and more specifically referred to individually as ports 102a, 102b, 102c, and 102d. The ports 102 are optically coupled to a substantially collimating/focussing lens 104, preferably in the form of a graded index (GRIN) lens, disposed adjacent the ports 102. The lens 104 is for focussing light at the ports 102 and for collimating light at a distal end of the switch at a reflector 106, in the form of a stationary reflecting mirror.

A moveable refractor 110, in the form of a light-transmissive wedge, is positionable in or out of the optical path between the lens 104 and the reflector 106. Alternatively, the refractor 110 comprises a prism or refractive optoelectronic device. An actuator 112 is provided for repositioning refractor 110 such that switching of the beam of light between ports 102 is performed. Optionally, a spacer 108 of light-transmissive material is placed in the optical path between the ports 102 and lens 104 to reduce insertion losses resulting from the air space which exists between the lens 104 and reflector 106.

In a first mode of operation, a beam of light from each of the ports 102a and 102b, traversing the lens 104 for collimation at the reflector 106, is reflected to adjacent ports 102d and 102c, respectively, after being focussed by the same lens 104.

In a second mode of operation, the two beams of light traverse the lens 104 and the refractor 110 for collimation and reflection at the reflector 106. The beams return by passing through the same refractor 110 and lens 104, and are directed in such a way that the beam transmitted from port 102b is focussed at port 102d, while the beam transmitted from port 102a is not directed to port 102c. As the beam traverses the air-refractor interface its direction changes according to Snell's Law.

Switching between the first and second mode of operation is effected by activating the actuator 112, which then moves the refractor 110 into or out of the optical path. Alternatively, the refractor 110 is positionable within the path of the beam for redirecting the beam of light.

Figure 2A:
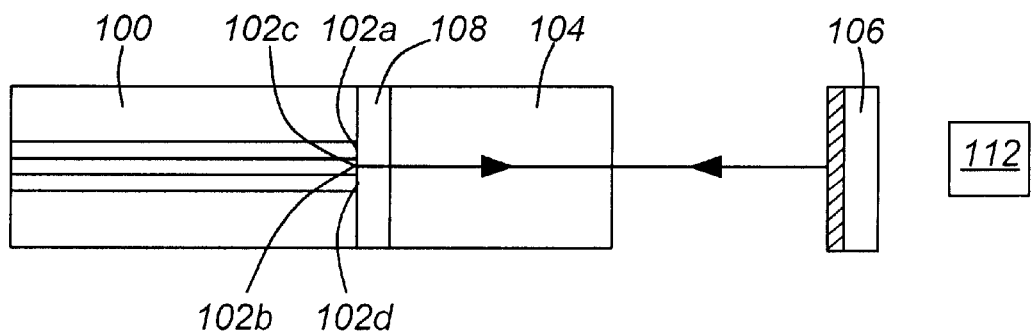
FIGS. 2a and 2c are illustrations of the invention showing a ray of light directed between optical fibre ports by an optical switch via a spacer, a lens and a reflector.
Figure 2B:
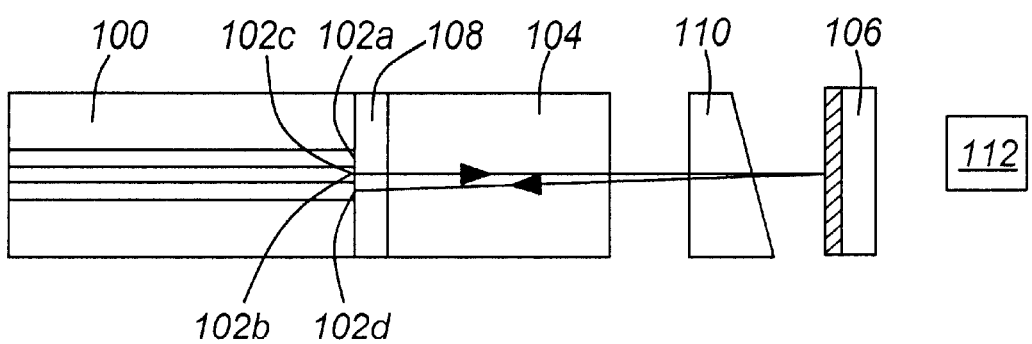
FIGS. 2b and 2d are schematic block diagrams showing one embodiment of the invention, wherein a ray of light directed between ports is redirected via a spacer, a lens, a reflector and a moveable refractor positionable between the lens and the reflector for selectably redirecting a beam of light between output ports.
Figure 2C:
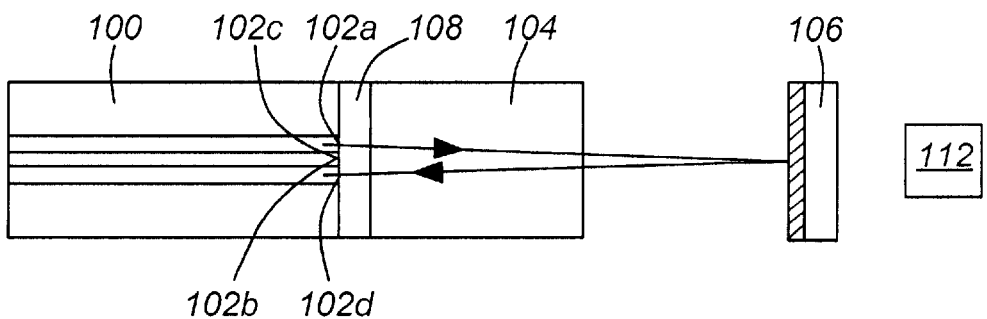
Figure 2D:
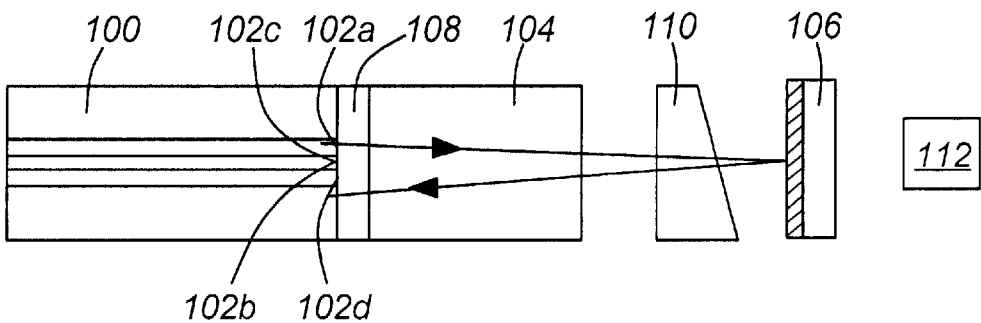

FIG. 2a illustrates a beam, represented by a ray directed from port 102b to 102c in the absence of the refractor 110. FIG. 2b illustrates a beam represented by a ray directed from port 102b to 102d with the refractor 110 in the path. FIG. 2c illustrates a beam, represented by a ray directed from port 102a to 102d in the absence of the refractor 110; and, FIG. 2d illustrates the beam represented by a ray directed from port 102a shown missing any of the other ports, wherein the light is lost.

Figure 3A:
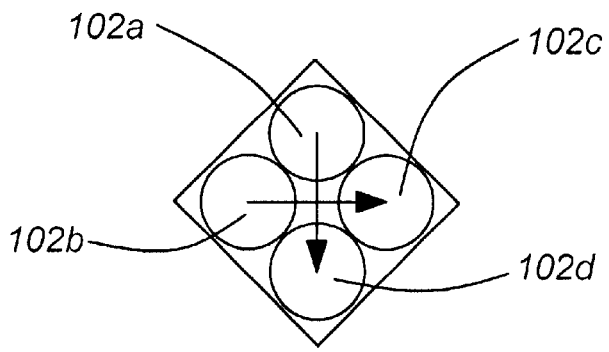
FIGS. 3a and 3b are end views of the ports, showing a representation of two modes of operation of the invention; in the first mode of operation two input ports are optically coupled with two output ports prior to switching, while in the second mode there is optical coupling between only one input and one output port.
Figure 3B:
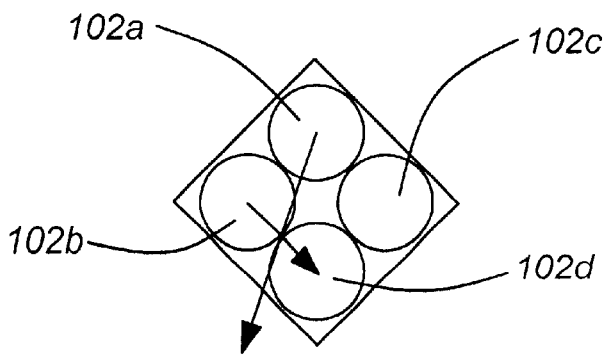

The first and second modes of operation of the switch as described heretofore are illustrated in FIGS. 3a and 3b. In the first mode of operation, ports 102a and 102b are optically coupled with port 102d and 102c, respectively. In the second mode of operation, port 102b is optically coupled with port 102d and ports 102a and 102c have no optical connection.

Figure 4:
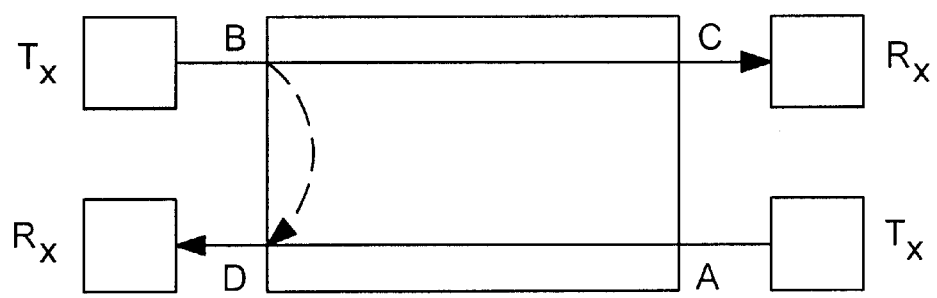
FIG. 4 is a schematic block diagram illustrating the functionality of the switch as described in FIGS. 3a and 3b.

FIG. 4 illustrates the functionality achievable with this embodiment, wherein a first and second mode of operation of the optical switch are indicated by solid and dotted lines, respectively. In the first mode of operation, transmitting port A is optically coupled to receiving port D, while transmitting port B is optically coupled to receiving port C. Following switching to the second mode of operation, port B is optically coupled to port D, and ports A and C are not optically coupled.

In a third mode of operation, the port 102a is inactive and a beam of light is transmitted from port 102b to port 102c. Following switching to a fourth mode of operation, light is transmitted from port 102b to port 102d. Switching between the third and fourth modes thus makes the device effectively a 1×2 switch.

Other configurations and modes of operation can be readily adapted, by rearranging the positions and number of input and output fibers, without departing from the scope of the invention. For example, the fibers may be arranged in a single row or a triangular pattern rather than a square array, or more than 4 fibers may be used. Additional prisms may be selectively inserted to achieve 1×3, 1×4, and other modes of operation.

Figure 5:
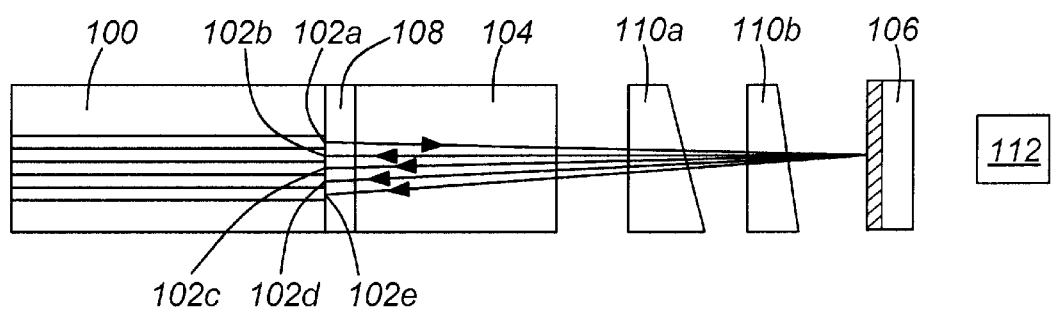
FIG. 5 is a schematic representation of another embodiment of the invention with a plurality (two) of movable refractors.

FIG. 5 illustrates the latter embodiment. Five ports 102a–102e are arranged in a linear array, and two refractors 110a and 110b are arranged to be moved into or out of the optical path. As illustrated in FIG. 5, both refractors are in the optical path and the input beam exits input port 102a and is directed to port 102e. While FIG. 5 shows also alternative beams directed to ports 102b, 102c and 102d, it will be understood that the alternative beams are only created by alternative positions of the refractors 110a and 110b as per the enclosed table showing the positions of refractors 110a and 110b, respectively, "out" or "in" the optical path of the optical beam emitted from the port 102a. This arrangement therefore represents a 1×4 switch.

| 110a | 102b | output |
|------|------|--------|
| out  | out  | 102b   |
| out  | in   | 102c   |
| in   | out  | 102d   |
| in   | in   | 102e   |

Advantageously, the optical switch in accordance with this invention is single-sided and all the fibres exit the switch on the same side, making the switch more compact than a two-sided device. Having one lens also makes the device smaller while reducing the manufacturing cost. Finally, using a moveable light-transmissive wedge as the refractor provides high tolerance to misalignments of light passing therethrough.

What is claimed is:

1. An optical switch comprising:
    a plurality of ports for transmitting and receiving an optical signal;
    a stationary reflector for receiving the optical signal from at least one of the plurality of ports and for substantially reflecting at least a portion of the optical signal to another of the plurality of ports;
    a lens disposed between the plurality of ports and the stationary reflector for substantially collimating the optical signal from at least one of the plurality of ports at the stationary reflector and for substantially focusing the optical signal about the plurality of ports; and
    a movable refractor selectably positionable between at least one of the plurality of ports and the stationary reflector, for selectably redirecting the optical signal from one of the plurality of ports to another of the plurality of ports via the lens and the stationary reflector, wherein the movable refractor is selectably repositionable at a first selectable position out of an optical path of the optical signal and at a second selectable position in the optical path of the optical signal.

2. The optical switch as defined in claim 1, wherein the moveable refractor is disposed between the lens and the stationary reflector.

3. The optical switch as defined in claim 1, wherein the moveable refractor is disposed out of an optical path between the lens and the stationary reflector.

4. The optical switch as defined in claim 1, wherein the moveable refractor is positionable between the lens and the stationary reflector.

5. The optical switch as defined in claim 1, wherein the moveable refractor is movable from the first selectable position out of the optical path to a second selectable position within the optical path of the optical signal for switching the optical signal.

6. The optical switch as defined in claim 1, wherein the moveable refractor is movable from the first selectable position within the optical path to a second selectable position within the optical path of the optical signal for switching the optical signal.

7. The optical switch as defined in claim 1, wherein the moveable refractor has an index of refraction which differs from an adjacent surrounding medium.

8. The optical switch as defined in claim 6, wherein the moveable refractor is for selectably redirecting the optical signal from a first selectable position to a second selectable position by refracting the optical signal.

9. The optical switch as defined in claim 5, further comprising an actuator for selectably repositioning the moveable refractor from the first selectable position to the second selectable position.

10. The optical switch as defined in claim 8, wherein the moveable refractor is a substantially light transmissive wedge.

11. The optical switch as defined in claim 8, wherein the moveable refractor is a prism.

12. The device as defined in claim 1, wherein each ports is disposed at an optical fibre end.

13. The device as defined in claim 1, wherein the reflector is a stationary, substantially reflective, mirror.

14. The device as defined in claim 1, wherein the collimating and focusing lens is a GRIN lens.

15. The device described in claim 1, further comprising a spacer positionable between the plurality of ports and the collimating lens for reducing insertion loss of the optical signal to the collimating lens.

16. The device described in claim 1, comprising a plurality of moveable refractors disposed between the plurality of ports and the stationary reflector.

* * * * *